United States Patent
Billa et al.

(10) Patent No.: US 7,389,229 B2
(45) Date of Patent: Jun. 17, 2008

(54) UNIFIED CLUSTERING TREE

(75) Inventors: Jayadev Billa, Evanston, IL (US);
Daniel Kiecza, Cambridge, MA (US);
Francis G. Kubala, Boston, MA (US)

(73) Assignee: BBN Technologies Corp., Cambridge, MA (US)

( * ) Notice: Subject to any disclaimer, the term of this patent is extended or adjusted under 35 U.S.C. 154(b) by 836 days.

(21) Appl. No.: 10/685,410

(22) Filed: Oct. 16, 2003

(65) Prior Publication Data

US 2005/0038649 A1  Feb. 17, 2005

Related U.S. Application Data

(60) Provisional application No. 60/419,214, filed on Oct. 17, 2002.

(51) Int. Cl.
*G10L 15/00* (2006.01)

(52) U.S. Cl. ...................................... 704/242

(58) Field of Classification Search ............... None
See application file for complete search history.

(56) References Cited

U.S. PATENT DOCUMENTS

| | | | |
|---|---|---|---|
| 4,879,648 A | 11/1989 | Cochran et al. | |
| 4,908,866 A | 3/1990 | Goldwasser et al. | |
| 5,317,732 A | 5/1994 | Gerlach, Jr. et al. | |
| 5,404,295 A | 4/1995 | Katz et al. | |
| 5,418,716 A | 5/1995 | Suematsu | |
| 5,544,257 A | 8/1996 | Bellegarda et al. | |
| 5,559,875 A | 9/1996 | Bieselin et al. | |
| 5,572,728 A | 11/1996 | Tada et al. | |
| 5,613,032 A | 3/1997 | Cruz et al. | |
| 5,614,940 A | 3/1997 | Cobbley et al. | |
| 5,684,924 A | 11/1997 | Stanley et al. | |
| 5,715,367 A * | 2/1998 | Gillick et al. ............... 704/254 | |
| 5,752,021 A | 5/1998 | Nakatsuyama et al. | |
| 5,757,960 A | 5/1998 | Murdock et al. | |
| 5,768,607 A | 6/1998 | Drews et al. | |
| 5,777,614 A | 7/1998 | Ando et al. | |

(Continued)

FOREIGN PATENT DOCUMENTS

EP  0664636  7/1995

(Continued)

OTHER PUBLICATIONS

Ahangar et al., "A Survey of Technologies for Parsing and Indexing Digital Video" Multimedia Communication Laboratory, Department of Electrical, Computer and Systems Engineering, Boston, MA, 1995.

(Continued)

*Primary Examiner*—Abul K. Azad
(74) *Attorney, Agent, or Firm*—Ropes & Gray LLP (57) ABSTRACT

A unified clustering tree (500) generates phoneme clusters based on an input sequence of phonemes. The number of possible clusters is significantly less than the number of possible combinations of input phonemes. Nodes (510, 511) in the unified clustering tree are arranged into levels such that the clustering tree generates clusters for multiple speech recognition models. Models that correspond to higher levels in the unified clustering tree are coarse models relative to more fine-grain models at lower levels of the clustering tree.

14 Claims, 6 Drawing Sheets

U.S. PATENT DOCUMENTS

| | | | |
|---|---|---|---|
| 5,787,198 A | | 7/1998 | Agazzi et al. |
| 5,806,032 A | * | 9/1998 | Sproat ........................ 704/255 |
| 5,835,667 A | | 11/1998 | Wactlar et al. |
| 5,862,259 A | | 1/1999 | Bokser et al. |
| 5,875,108 A | | 2/1999 | Hoffberg et al. |
| 5,960,447 A | | 9/1999 | Holt et al. |
| 5,963,940 A | | 10/1999 | Liddy et al. |
| 5,970,473 A | | 10/1999 | Gerszberg et al. |
| 6,006,184 A | * | 12/1999 | Yamada et al. ............. 704/246 |
| 6,006,221 A | | 12/1999 | Liddy et al. |
| 6,024,571 A | | 2/2000 | Renegar |
| 6,026,388 A | | 2/2000 | Liddy et al. |
| 6,029,124 A | | 2/2000 | Gillick et al. |
| 6,029,195 A | | 2/2000 | Herz |
| 6,052,657 A | | 4/2000 | Yamron et al. |
| 6,064,963 A | | 5/2000 | Gainsboro |
| 6,067,514 A | | 5/2000 | Chen |
| 6,067,517 A | | 5/2000 | Bahl et al. |
| 6,073,096 A | * | 6/2000 | Gao et al. ................... 704/245 |
| 6,076,053 A | * | 6/2000 | Juang et al. ................ 704/236 |
| 6,088,669 A | | 7/2000 | Mayes |
| 6,112,172 A | | 8/2000 | True et al. |
| 6,119,163 A | | 9/2000 | Monteiro et al. |
| 6,151,598 A | | 11/2000 | Shaw et al. |
| 6,161,087 A | | 12/2000 | Wightman et al. |
| 6,169,789 B1 | | 1/2001 | Rao et al. |
| 6,185,531 B1 | | 2/2001 | Schwartz et al. |
| 6,219,640 B1 | | 4/2001 | Basu et al. |
| 6,246,983 B1 | | 6/2001 | Zou |
| 6,253,179 B1 | | 6/2001 | Beigi et al. |
| 6,266,667 B1 | | 7/2001 | Olsson |
| 6,308,222 B1 | | 10/2001 | Krueger et al. |
| 6,317,716 B1 | | 11/2001 | Braida et al. |
| 6,332,139 B1 | | 12/2001 | Kaneko et al. |
| 6,332,147 B1 | | 12/2001 | Moran et al. |
| 6,345,252 B1 | | 2/2002 | Beigi et al. |
| 6,347,295 B1 | | 2/2002 | Vitale |
| 6,360,234 B2 | | 3/2002 | Jain et al. |
| 6,360,237 B1 | | 3/2002 | Schulz et al. |
| 6,373,985 B1 | | 4/2002 | Hu et al. |
| 6,381,640 B1 | | 4/2002 | Beck et al. |
| 6,434,520 B1 | | 8/2002 | Kanevsky et al. |
| 6,437,818 B1 | | 8/2002 | Ludwig et al. |
| 6,463,444 B1 | | 10/2002 | Jain et al. |
| 6,480,826 B2 | | 11/2002 | Pertrushin |
| 6,567,980 B1 | | 5/2003 | Jain et al. |
| 6,571,208 B1 | * | 5/2003 | Kuhn et al. .................. 704/250 |
| 6,602,300 B2 | | 8/2003 | Ushioda et al. |
| 6,604,110 B1 | | 8/2003 | Savage et al. |
| 6,611,803 B1 | | 8/2003 | Furuyama et al. |
| 6,624,826 B1 | | 9/2003 | Balabanovic |
| 6,647,383 B1 | | 11/2003 | August et al. |
| 6,654,735 B1 | | 11/2003 | Eichstaedt et al. |
| 6,708,148 B2 | | 3/2004 | Gschwendtner et al. |
| 6,711,541 B1 | * | 3/2004 | Kuhn et al. .................. 704/242 |
| 6,714,911 B2 | | 3/2004 | Waryas et al. |
| 6,718,303 B2 | | 4/2004 | Tang et al. |
| 6,718,305 B1 | * | 4/2004 | Hab-Umbach .............. 704/245 |
| 6,728,673 B2 | | 4/2004 | Furuyama et al. |
| 6,732,183 B1 | | 5/2004 | Graham |
| 6,748,350 B2 | | 6/2004 | Rumer et al. |
| 6,778,958 B1 | | 8/2004 | Nishimura et al. |
| 6,778,979 B2 | | 8/2004 | Grefenstette et al. |
| 6,792,409 B2 | | 9/2004 | Wutte |
| 6,847,961 B2 | | 1/2005 | Silverbrook et al. |
| 6,877,134 B1 | | 4/2005 | Fuller et al. |
| 6,922,691 B2 | | 7/2005 | Flank |
| 6,931,376 B2 | | 8/2005 | Lipe et al. |
| 6,961,954 B1 | | 11/2005 | Maybury et al. |
| 6,973,428 B2 | | 12/2005 | Boguraev et al. |
| 6,978,277 B2 | | 12/2005 | Reed et al. |
| 6,999,918 B2 | | 2/2006 | Ma et al. |
| 7,131,117 B2 | | 10/2006 | Mills et al. |
| 7,146,317 B2 | | 12/2006 | Bartosik et al. |
| 7,171,360 B2 | | 1/2007 | Huang et al. |
| 7,257,528 B1 | | 8/2007 | Ritchie et al. |
| 2001/0026377 A1 | | 10/2001 | Ikegami |
| 2001/0051984 A1 | | 12/2001 | Fukasawa |
| 2002/0001261 A1 | | 1/2002 | Matsui et al. |
| 2002/0010575 A1 | | 1/2002 | Haase et al. |
| 2002/0010916 A1 | | 1/2002 | Thong et al. |
| 2002/0049589 A1 | | 4/2002 | Poirier |
| 2002/0059204 A1 | | 5/2002 | Harris |
| 2002/0133477 A1 | | 9/2002 | Abel |
| 2002/0184373 A1 | | 12/2002 | Maes |
| 2003/0051214 A1 | | 3/2003 | Graham et al. |
| 2003/0088414 A1 | | 5/2003 | Huang et al. |
| 2003/0093580 A1 | | 5/2003 | Thomas et al. |
| 2003/0167163 A1 | | 9/2003 | Glover et al. |
| 2003/0224780 A1 | | 12/2003 | Rodman |
| 2004/0024739 A1 | | 2/2004 | Copperman et al. |
| 2004/0073444 A1 | | 4/2004 | Peh et al. |
| 2005/0060162 A1 | | 3/2005 | Mohit et al. |
| 2006/0129541 A1 | | 6/2006 | Morgan et al. |

FOREIGN PATENT DOCUMENTS

| | | |
|---|---|---|
| EP | 0935378 | 8/1999 |
| EP | 0715298 | 6/2000 |
| EP | 1079313 | 2/2001 |
| EP | 1103952 | 5/2001 |
| EP | 1176493 | 1/2002 |
| EP | 1 422 692 A2 | 5/2004 |
| JP | 361285570 A | 12/1986 |
| WO | WO-99/17235 | 4/1999 |
| WO | WO-00/59223 | 10/2000 |
| WO | WO-02/29612 | 4/2002 |
| WO | WO-02/29614 | 4/2002 |

OTHER PUBLICATIONS

Change et al., "Columbia's VoD and Multimedia Research Testbed With Heterogeneous Network Support" Journal on Multimedia Tools and Applications, Special Issue on Video on Demand, Kluwer Academic Publishers, 1997, p. 1-10.

"Informedia: Integrated Speech, Image, and Language Understanding for the Creation and Exploration of Digital Video Libraries", Carnegie Mellon University Informedia Digital Video Library, NSF Cooperative Agreement IRI 9411299, Quarterly Report, Aug. 1996, Howard D. Wactlar, Project Director, http://www.informedia.cs.cmu.edu/dll1/reports/Quarterly7_Aug1996.html as accessed on Jun. 22, 2006.

Wactlar et al., "Informedia™: News-on-Demand Experiments in Speech Recognition", School of Computer Science, Carnegie Mellon University, Pittsburgh, PA 15213-3890, 1996.

Gauch et al., "Real Time Video Analysis for Automatic Archive Creation" Electrical Engineering and Computer Science, The University of Kansas, pp. 1-18, 1998.

Nakamura et al., "Semantic Analysis for Video Contents Extraction-Spotting by Association in News Video", Institute of Information Sciences and Electronics, University of Tsukuba, Japan, 1997.

Van Thong et al., "SPEECHBOT: An Experimental Speech-Based Search Engine for Multimedia Content in the Web", Compaq, Cambridge Research Laboratory, Technical Report Series CRL, Jul. 2001.

Christel et al., "Techniques for the Creation and Exploration of Digital Video Libraries", Multimedia Tools and Applications, 1996.

Hauptman et al., "Text, Speech, and Vision for Video Segmentation: The Informedia™ Project" School of Computer Science, Carnegie Mellon University, 1995.

Disz et al., "The Argonne Voyager Multimedia Server, Mathematics and Computer Science Division" Argonne National Laboratory, Argonne, IL, 1997.

The Informedia Digital Video Library: Integrated Speech, Image, and Language Understanding for the Creation and Exploration of Digital Video Libraries, Proposal responding to Announcement NSF 93-141 Research on Digital Libraries Copyright (c) 1994, pp. 1-48, http://www.informedia.cs.cmu.edu/dli1/reports/dli1proposal.html accessed on Jun. 22, 2006.

Hampapur et al., "Virage Video Engine", Virage Inc., 1997.

Li et al., "VISION: A Digital Video Library," Dept. of Electrical Engineering and Computer Science, The University of Kansas, pp. 19-27, 1996.

Beigi et al., "A Distance Measure Between Collections of Distributions and its Applications to Speaker Recognition" IEEE International Conference on Acoustics, Speech and Signal Processing, ICASSP'89, May 12-15, 1998, vol. 2, pp. 753-756.

Ferret al., "A Thematic Segmentation Procedure for Extracting Semantic Domains from Texts".

Cutting, et al "A Practical Part-of-Speech Tagger," Proceedings of the 3rd Conference on Applied Natural Language Processing, ACL 1992, pp. 133-140.

Beeferman et al, "Cyberpunc: A Lightweight Punctuation Annotation System for Speech," Proceedings of the 1999 IEEE Conference on Acoustics, Speech and Signal Processing, ICASSP'98 May 12-15, 1999, 2:689-692.

Shriberg et al, "Can Prosody Aid the Automatic Processing of Mult-Party Meetings? Evidence from Predicting Punctuation, Disfluencies, and Overlapping Speech," Proceedings of the ISCA Tutorial and Research Workshop on Prosody in Speech Recognition and Understanding, Oct. 2001, pp. 139-140.

Guavain et al, "Transcribing Broadcast News Shows," IEEE International Conference on Acoustics, Speech and Signal Processing, ICASSP'97, 2:21-24, Apr. 1997, p. 715-718.

Waibel et al, "Meeting Browser: Tracking and Summarizing Meetings," Proceedings of DARPA Broadcast News Workshop, 1998.

Amit Srivastava et al.: "Sentence Boundary Detection in Arabic Speech," 8th *European Conference on Speech Communication and Technology*, Sep. 1-4, 2003 in Geneva, Switzerland; 4 pages.

Sreenivasa Sista et al.: "Unsupervised Topic Discovery Applied To Segmentation Of News Transcriptions," 8th *European Conference on Speech Communication and Technology*, Sep. 1-4, 2003 in Geneva. Switzerland; 4 pages.

Daben Liu et al.: "Online Speaker Clustering," *ICASSP 2003*, vol. 1, pp. 572-575, 2003 Hong Kong.

J. Billa et al.: "Audio Indexing of Arabic Broadcast News," *ICASSP 2002*; Orlando, FL; May 13-17, 2002; 4 pages.

Scott Shepard et al.: "Oasis Translator's Aide," *Human Language Technology Conference*; San Diego, California; 2002; 2 pages.

Scott Shepard et al.: "Newsroom OnTAP—Real-time alerting from streaming audio," Dec.-Jan. 2001 HLT Paper; 2 pages.

Heidi Christensen et al.: "Punctuation Annotation using Statistical Prosody Models," *The Proceedings of Eurospeech*, Denmark, 2001; 6 pages.

Ji-Hwan Kim et al.: "The Use Of Prosody In A Combined System For Punctuation Generation And Speech Recognition," *The Proceedings of Eurospeech*, Denmark, 2001; 4 pages.

Jing Huang et al.: "Maximum Entropy Model For Punctuation Annotation From Speech," *The Proceedings of Eurospeech*, Denmark, 2001; pp. 917-920.

Yoshihiko Gotoh et al.: "Sentence Boundary Detection in Broadcast Speech Transcripts," *Proceedings of the International Speech Communication Association Workshop: Automatic Speech Recognition: Challenges for the New Millennium*, Paris, Sep. 2000; 8 pages.

John Makhoul et al.: "Speech and Language Technologies for Audio Indexing and Retrieval," *Proceedings of the IEEE*, vol. 88, No. 8, Aug. 2000; pp. 1338-1353.

Francis Kubala et al.: "Integrated Technologies For Indexing Spoken Language," *Communications of the ACM*, vol. 43, No. 2, Feb. 2000; pp. 48-56.

Sean Colbath et al.: "Spoken Documents: Creating Searchable Archives from Continuous Audio," *Proceedings of the 33rd Hawaii International Conference on System Sciences-2000*; pp. 1-9.

Francis Kubala et al.: "Situation Awareness Contexts for Smart Environments," *Inter-Agency Workshop on Research Issues for Smart Environments*; Atlanta, GA; 2000; 3 pages.

Daben Liu et al.: "Fast Speaker Change Detection For Broadcast News Transcription And Indexing," *The Proceedings of Eurospeech 1999*; Budapest, Hungary; 4 pages.

Daniel M. Bikel et al.: "An Algorithm that Learns What's in a Name," *Machine Learning*, 1999; pp. 1-20.

Richard Schwartz et al.: "Accurate Near-Real-Time Recognition of Broadcast News using Multiple-Pass Search Techniques," *1999 Workshop on Automatic Speech Recognition and Understanding*, Dec. 12-15, 1999; Keystone, Colorado; 6 pages.

Francis Kubala et al.: "Smart Information Spaces: Managing Personal and Collaborative Histories," *Proceedings of the 1998 Darpa/NIST Smart Spaces Workshop*, Jul. 30-31, 1998; 6 pages.

Daben Liu et al.: "Improvements in Spontaneous Speech Recognition," *Proceedings of the DARPA Broadcast News Transcription and Understanding Workshop*; Feb. 8-11, 1998 in Landsdowne, Virginia; 5 pages.

Francis Kubala et al.: "The 1997 BBN Byblos System Applied To Broadcast News Transcription," Cambridge, Massachusetts; 1997; 6 pages.

Hubert Jin et al.: "Automatic Speaker Clustering," *ICFEM*, Chantilly, Virginia; Feb. 1997; 4 pages.

Sean Colbath et al.: "OnTAP: Mixed-media Multi-lingual Language Processing," *Human Language Technology Conference*, San Diego, CA; 2002; 2 pages.

Andreas Stolcke et al.: "Automatic Linguistic Segmentation Of Conversational Speech," *Proceedings of the International Conference on Spoken Language Processing*, vol. 2, Philadelphia 1996; pp. 1005-1008.

Scott S. Chen et al.: "Speaker, Environment and Channel Change Detection and Clustering via the Bayesian Information Criterion," in DARPA Speech Recognition Workshop, 1998, 6 pages.

Marti A. Hearst: "Multi-Paragraph Segmentation of Expository Test," in Proceedings of the 2nd Annual Meeting of the Association for Computational Linguistics, New Mexico State University, Las Cruces, NM, 1994, pp. 1-8.

Office Action issued in U.S. Appl. No. 10/610,560, filed Feb. 7, 2008.

Office Action issued in U.S. Appl. No. 10/685,479, filed Nov. 16, 2001.

Office Action issued in U.S. Appl. No. 10/610,532 on Feb. 20, 2007.
Office Action issued in U.S. Appl. No. 10/610,559 on Oct. 12, 2007.
Office Action issued in U.S. Appl. No. 10/610,696 on Sep. 14, 2007.
Office Action issued in U.S. Appl. No. 10/610,699 on Jun. 20, 2007.
Office Action issued in U.S. Appl. No. 10/685,403 on Mar. 21, 2007.
Office Action issued in U.S. Appl. No. 10/685,445 on Oct. 23, 2007.
Office Action issued in U.S. Appl. No. 10/685,478 on Oct. 23, 2007.
Office Action issued in U.S. Appl. No. 10/685,478 on May 4, 2007.
Office Action issued in U.S. Appl. No. 10/685,566 on Sep. 27, 2007.
Office Action issued in U.S. Appl. No. 10/685,586 on Sep. 28, 2007.

Ahanger et al., "A Survey of Technologies for Parsing and Indexing Digital Video" Multimedia Communication Laboratory, Department of Electrical, Computer and Systems Engineering, Boston, MA, 1995.

Fancourt et al., "On The Use of Neural Networks In the Generalized Likelihood Ratio Test For Detecting Abrupt Changes In Signals," IEEE, IJCNN, pp. 243-248, 2000.

Hampapur et al., "Virage Video Engine", Virage Inc, 1997.

Hauptman et al., "Text, Speech, and Vision for Video Segmentation: The Informedia Project" School of Computer Science, Carnegie Mellon University, 1995.

Siegler et al., "Automatic Segmentation, Classification and Clustering of Broadcast News Audio," Proceedings of the DARPA Broadcast News Transcription and Understanding Workshop, 1998.

The Informedia Digital Video Libray: Integrated Speech, Image, and Language Understanding for the Creation and Exploration of Digital Video Libraries, Proposal responding to Announcement NSF 93-141 Research on Digital Libraries Copyright (c) 1994. http://www.informedia.cs.cmu.edu/dli1/reports/dli1Proposal.html accessed on Jun. 22, 2006. pp. 1-48.

Voutilainen, A., "A Syntax-Based Part-Of-Speech Analyzer," EACL-95, pp. 157-164, 1995.

Wactlar et al., "Informedia: News-on-Demand Experiments in Speech Recognition", School of Computer Science, Carnegie Mellon University, Pittsburg, PA 15213-3890, 1996.

\* cited by examiner

UNIFIED CLUSTERING TREE

RELATED APPLICATIONS

This application claims priority under 35 U.S.C. § 119 based on U.S. Provisional Application No. 60/419,214 filed Oct. 17, 2002, the disclosure of which is incorporated herein by reference.

BACKGROUND OF THE INVENTION

A. Field of the Invention

The present invention relates generally to speech recognition and, more particularly, to speech recognition models.

B. Description of Related Art

Speech has not traditionally been valued as an archival information source. As effective as the spoken word is for communicating, archiving spoken segments in a useful and easily retrievable manner has long been a difficult proposition. Although the act of recording audio is not difficult, automatically transcribing and indexing speech in an intelligent and useful manner can be difficult.

Speech recognition systems are generally based on statistical models. The models are trained on a speech signal and a corresponding transcription of the speech signal. The models "learn" how the speech signal corresponds to the transcription. Conventional models are frequently implemented based on Hidden Markov Models (HMMs).

Figure 1:
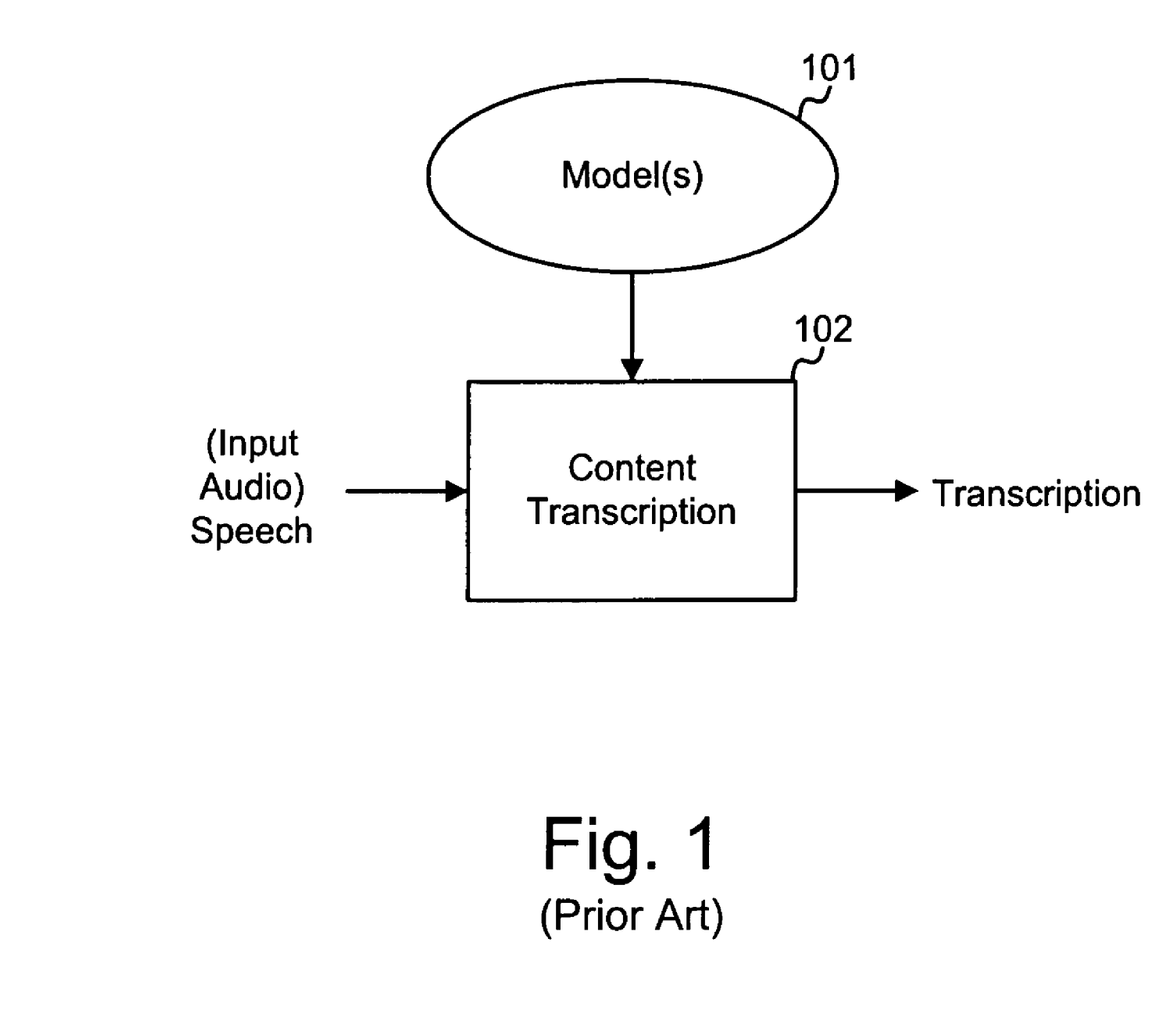
FIG. 1 is a diagram illustrating a conventional speech recognition system.

FIG. 1 is a diagram illustrating a conventional speech recognition system. A content transcription component 102 receives an input audio stream. The content transcription component 102 converts speech in the input audio stream into text based on language and acoustic model(s) 101. Model(s) 101 are pre-trained based on a training audio stream that is expected to be similar to the run-time version of the input audio stream.

Figure 2:
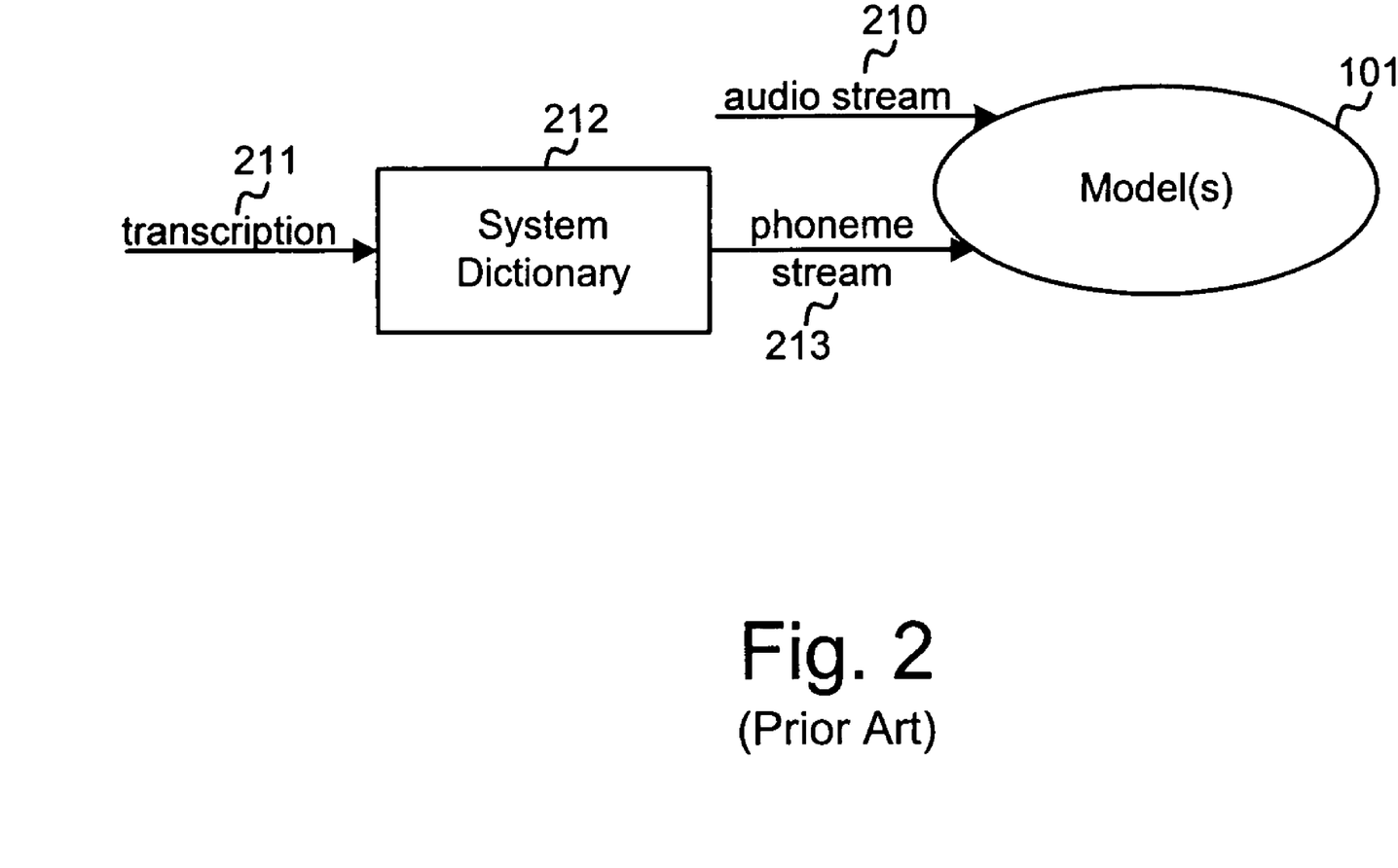
FIG. 2 is a diagram illustrating training of models of the speech recognition system of FIG. 1.

FIG. 2 is a diagram illustrating training of models 101 in additional detail. When training, models 101 receive the input audio stream 210 and a corresponding transcription 211 of the input audio stream. Transcription 211 may be meticulously generated by a human based on the input audio stream 210. Transcription 211 may be converted into a stream of phonemes 213 by system dictionary 212. System dictionary 212 includes correspondences between the written orthographic representation of a word and the phonemes that correspond to the word. A phoneme is generally defined as the smallest acoustic event that distinguishes one word from another.

Models 101 may model each individual phoneme in the audio stream in the context of its surrounding phonemes. Thus, model 101 may model a target sound using the phonemes that immediately proceed and succeed the target sound. A more complex model may use two proceeding and two succeeding phonemes. In English, there are approximately 50 phonemes. Accordingly, for a model using one phoneme on each side of the target phoneme, there are approximately 125,000 ($50^3$) possible phoneme groups to model. For a model using two phonemes on each side, there are 322,500,000 ($50^5$) possible phoneme groups. Because of the large number of phoneme groups, individually modeling each of the phoneme groups could require impractically complex models. Additionally, a training set that fully covered each possible phoneme group would be inordinately large.

Accordingly, conventional speech recognition models may be based on phoneme clusters in which each phoneme cluster corresponds to a number of individual phoneme groups. One phoneme cluster, for example, may correspond to all phoneme groups in which the middle sound is a hard "C" sound. A model may use only 2,000-5,000 phoneme clusters instead of the 125,000 or more possible phoneme groups. The reduced number of phoneme clusters relative to the original phoneme groups allows for less complex speech recognition models and smaller training data sets.

One problem associated with phoneme clustering is determining the mapping of which phoneme groups to assign to which phoneme clusters. One conventional technique for mapping groups to clusters is based on a statistical analysis of the training data. A problem with this technique is that it does not generalize well to phoneme groups that are not present in the training data.

A second conventional technique for mapping groups to clusters is based on a clustering decision tree. A decision tree uses a predetermined series of questions to categorize a phoneme group into one of the phoneme clusters. For example, a decision tree may first determine whether the left-most phoneme in a group corresponds to a vowel sound. If so, a second question, such as whether the right-most phoneme corresponds to a fricative sound, is asked. If not, a different second question, such as whether the left-most phoneme corresponds to a silence, is asked. Eventually, the answer to a question will lead to a node of the decision tree that assigns the phoneme grouping to a cluster. In this manner, each phoneme group is assigned to a cluster based on a sequence of questions where the particular sequence is determined by nodes in the clustering tree.

In contrast to mapping clusters based on a statistical analysis of the training data, classifying phoneme groups based on a decision tree tends to lead to more accurate clustering when classifying data not in the training data. Phoneme groups that were not in the training data but that are similar to groups in the training data will tend to follow the same path down the clustering tree as the similar phoneme groups. Accordingly, the clustering tree generalizes well when dealing with new phoneme groups.

A problem associated with clustering trees is that the questions in the trees and the topology of the trees are manually designed by a speech expert. A tree can be complex and is often designed for a specific speech recognition model. Speech recognition systems often include multiple models that, therefore, require the separate creation and maintenance of multiple clustering trees. This can be costly and the independent nature of the clustering trees and the models can lead to non-optimal overlapping results.

Thus, there is a need in the art for improved clustering trees.

SUMMARY OF THE INVENTION

Systems and methods consistent with the present invention implement speech recognition using a unified clustering tree from which multiple speech recognition models receive input phoneme clusters. The unified clustering tree is segmented into levels from which the models are derived.

One aspect of the invention is directed to a data structure encoded on a computer readable medium. The data structure includes data that defines decision nodes associated with questions that relate to a group of sounds and data that defines terminal nodes that define a sound cluster to which the group of sounds belong. The decision nodes and the terminal nodes are defined hierarchically relative to one another and the decision nodes and the terminal nodes are divided into levels, where each level is associated with a different speech recognition model.

A second aspect consistent with the invention is directed to a method of building a clustering tree for classifying a group of sounds into one of a number of possible sound clusters. The method includes building a first level of the clustering tree with a first hierarchical arrangement of decision nodes in which each decision node of the first hierarchical arrangement is associated with one of a first group of questions relating to the group of sounds. The method further includes building a second level of the clustering tree with a second hierarchical arrangement of decision nodes in which each decision node of the second hierarchical arrangement is associated with one of a second group of questions relating to the group of sounds. The second group of questions discriminating at a finer level of granularity within the group of sounds than the first group of questions.

A third aspect consistent with the invention is directed to a speech recognition system that comprises a clustering tree and speech recognition models. The clustering tree classifies a series of sounds into predefined clusters based on one of the sounds and on a predetermined number of neighboring sounds that surround the one of the sounds. The speech recognition models are trained to recognize speech based on the predefined clusters, where each of the speech recognition models receives the predefined clusters from a different portion of the clustering tree.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

Systems and methods consistent with the present invention include a unified clustering tree that generates phoneme clusters for multiple speech recognition models. The unified clustering tree is designed such that different levels of the tree generate the phoneme clusters for the different models. The different models may include different model classes, such as triphone models and quinphone models.

System Overview

Figure 3:
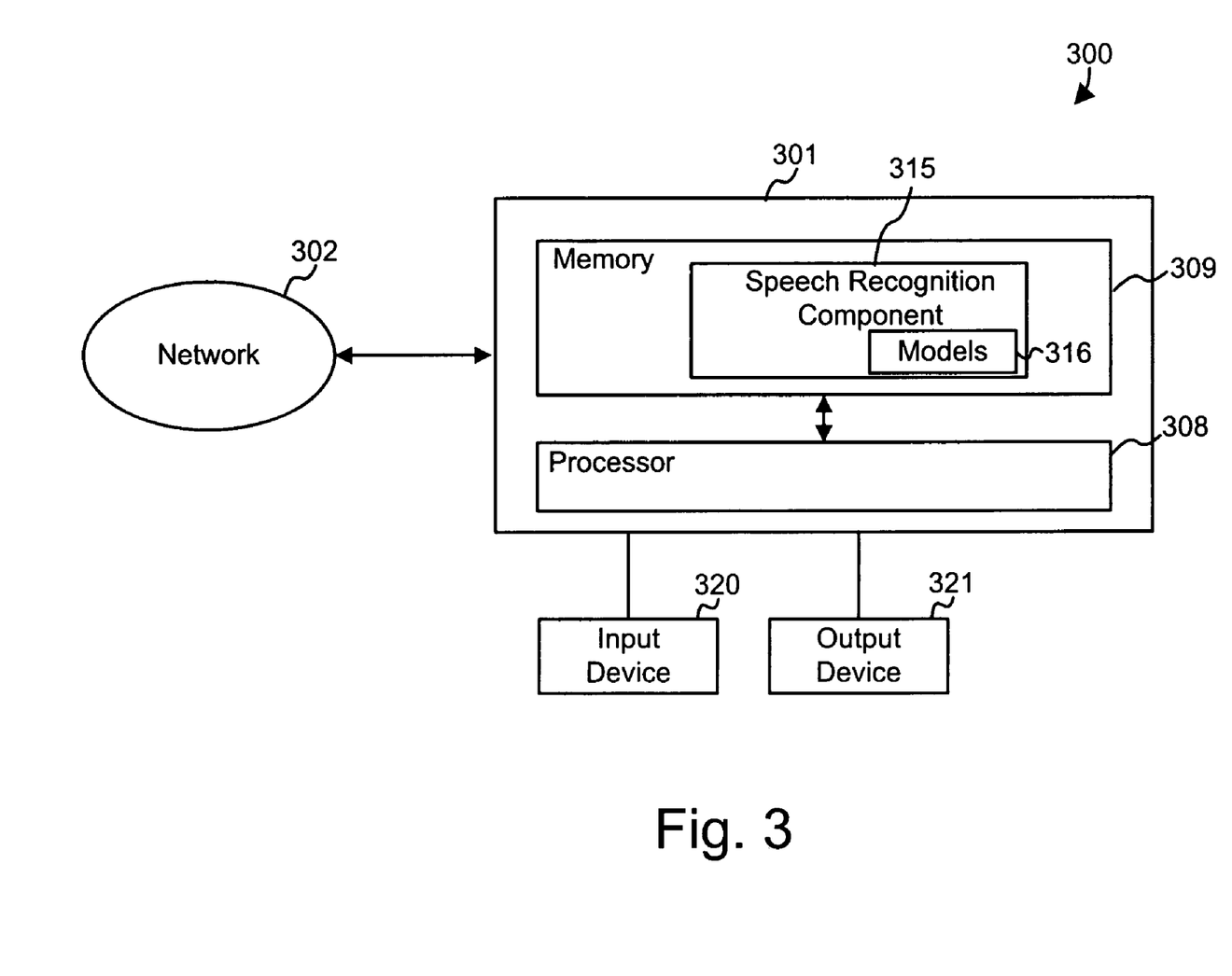
FIG. 3 is a diagram illustrating an exemplary system in which concepts consistent with the invention may be implemented.

Speech recognition, as described herein, may be performed on one or more processing devices or networks of processing devices. FIG. 3 is a diagram illustrating an exemplary system 300 in which concepts consistent with the invention may be implemented. System 300 includes a computing device 301 that has a computer-readable medium 309, such as random access memory, coupled to a processor 308. Computing device 301 may also include a number of additional external or internal devices. An external input device 320 and an external output device 321 are shown in FIG. 3. Input devices 320 may include, without limitation, a mouse, a CD-ROM, and/or a keyboard. Output devices 321 may include, without limitation, a display and/or an audio output device, such as a speaker.

In general, computing device 301 may be any type of computing platform, and may be connected to a network 302. Computing device 301 is exemplary only. Concepts consistent with the present invention can be implemented on any computing device, whether or not connected to a network.

Processor 308 executes program instructions stored in memory 309. Processor 3 can be any of a number of well-known computer processors, such as processors from Intel Corporation, of Santa Clara, Calif.

Memory 309 may contain application programs and data. In particular, memory 309 may include a speech recognition component 315. Speech recognition component 315 may contain HMM-based speech recognition models 316. Models 316 may be trained using phoneme clusters assigned by a clustering tree.

System Operation

Figure 4:
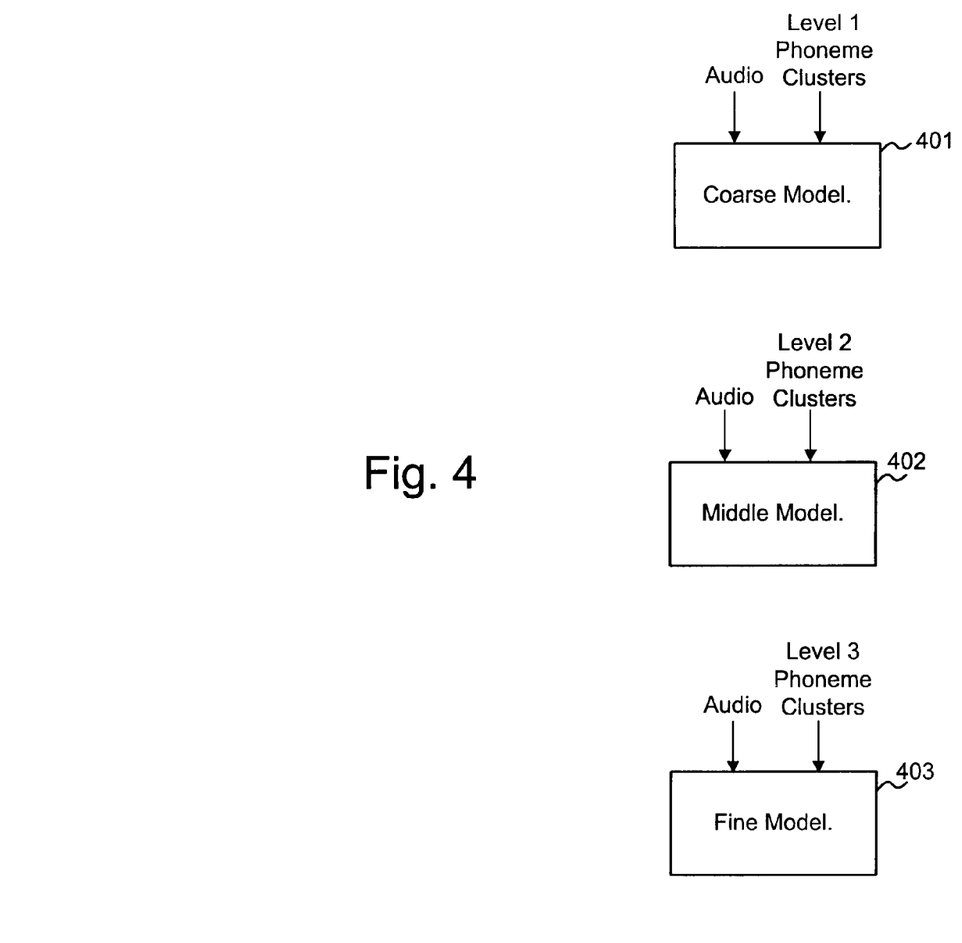
FIG. 4 is a diagram illustrating training of speech recognition models.

FIG. 4 is a diagram illustrating training of speech recognition models 316 according to an implementation consistent with the invention. Models 316 may be implemented as a hierarchical arrangement of three separate models, labeled as coarse model 401, middle model 402, and fine model 403.

During training, coarse model 401 receives the training audio stream and an indication of the phoneme clusters that correspond to the audio stream. The phoneme cluster input to coarse model 401 includes phoneme clusters, labeled as level 1 phoneme clusters, generated by a first level of a unified cluster tree (described in more detail below). Similarly, the phoneme cluster input to middle model 402 includes phoneme clusters, labeled as level 2 phoneme clusters, generated by a second level of the unified cluster tree, and the phoneme cluster input to fine model 403 includes phoneme clusters, labeled as level 3 phoneme clusters, generated by a third level of the unified cluster tree. Middle model 402 may also receive the level 1 phoneme clusters and fine model 403 may also receive the level 1 and level 2 phoneme clusters.

Coarse model 401 is designed such that, during run-time operation, coarse model 401 performs a rough recognition of the speech in the incoming audio stream. A goal of coarse model 401 is not to omit correct answers. In general, finer speech models have a greater risk of incorrectly recognizing speech. Coarse model 401 performs a "first pass" of the input speech by minimizing risk at the expense of a finer grain recognition. Coarse model 401 may include a triphone non-crossword model. A triphone model refers to a language model that uses three phonemes—two context phonemes that surround the phoneme that is being modeled—when making phoneme recognition decisions. Non-crossword means that the model does not attempt to deal with phonemes that cross word boundaries.

Middle model 402 refines the speech recognized by coarse model 401. Middle model 402 refines the output of coarse model 401 by more precisely recognizing phonemes in the speech. The phonemes recognized by middle model 402 have a higher risk of incorrect classification than those recognized by coarse model 401. Middle model 402 may include a quinphone non-crossword model. A quinphone model uses five phonemes—four context phonemes that surround the phoneme that is being modeled—when making phoneme recognition decisions.

Fine model 403 refines the classifications from middle model 402. Fine model 403 is designed to recognize phonemes in the incoming audio stream to a high level of detail. Fine model 403 may include a quinphone crossword model.

Figure 5:
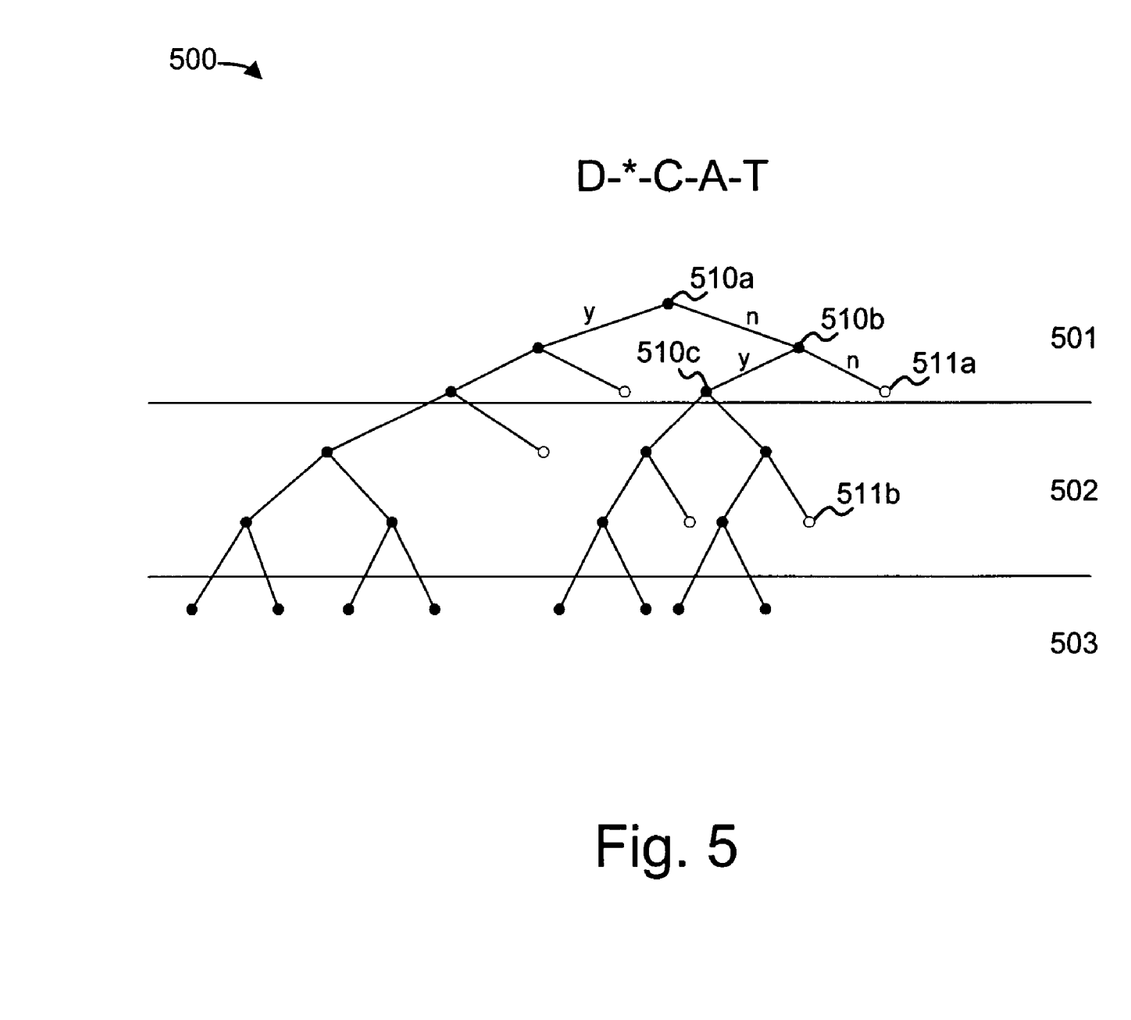
FIG. 5 is a diagram illustrating a unified clustering tree consistent with an aspect of the invention for generating phoneme clusters.

Models 401-403 may be trained on phoneme clusters instead of directly on the triphone and quinphone phoneme groups. FIG. 5 is a diagram illustrating a unified clustering tree 500 consistent with an aspect of the invention for generating the phoneme clusters. Clustering tree 500 can be conceptually broken into three levels: a first level 501, a second level 502, and a third level 503. The clusters generated by first level 501 (level 1 phoneme cluster) are used by coarse model 401. Similarly, the clusters generated by second level 502 (level 2 phoneme cluster) and third level 503 (level 3 phoneme cluster) are used by middle model 402 and fine model 403, respectively. Middle model 402 may additionally use the clusters generated for coarse model 401 and fine model 403 may additionally use the clusters generated for coarse model 401 and middle model 402.

Unified clustering tree 500 includes a number of decision nodes, such as nodes 510a-510c (shown as darkened circles), and terminal nodes, such as nodes 511a-511b (shown as open circles). Decision nodes 510 correspond to questions or decision criteria that is applied to the current phoneme group. The response at a decision node 510 is used by speech recognition component 315 in determining how to move down to the next node in clustering tree 500. This process is repeated until a terminal node is encountered.

Terminal nodes 511 correspond to a single phoneme cluster. Thus, terminal node 511a may correspond to a first cluster and terminal node 511b may correspond to a second cluster. Each phoneme group applied to clustering tree 500 is classified into the phoneme cluster based on the terminal node 511 in which the phoneme group is placed.

For ease of explanation, unified clustering tree 500 is a smaller clustering tree than that which may be typically implemented. A more useful unified clustering tree may have, for example, upwards of 2,000 nodes.

As an example of traversing unified clustering tree 500, consider the phoneme group "D-*-C-A-T," where "*" indicates silence. The center phoneme "C" the phoneme being modeled. Node 510a may determine whether the phoneme to the immediate left of the center phoneme represents a vowel sound. In this example, the answer is no, and the clustering tree proceeds to node 510b.

Node 510b may determine whether the phoneme to the left of the center phoneme represents silence. In this example, the answer is yes, and the decision tree proceeds to node 510c. In this manner, unified clustering tree is traversed until a terminal node is encountered. The terminal node indicates to which cluster the phoneme group is assigned.

The specific questions to use for each of nodes 510 may be determined by a speech expert based on the particular speech recognition problem. In general, unified clustering tree 500 is designed such that the questions become more detailed as the clustering tree progresses from level 501 to level 503. Questions in level 501, for example, may be based only on the center phoneme and its two surrounding phonemes while questions in levels 502 and 503 may be based on the center phoneme and its four surrounding phonemes. The triphone coarse model 401, which is based on the clusters identified by level 501, follows from the questions corresponding to the nodes in level 501. Similarly, quinphone models 402 and 403 follow from the questions corresponding to the nodes in levels 502 and 503. In this manner, unified clustering tree 500 drives the creation of models 401-403.

Figure 6:
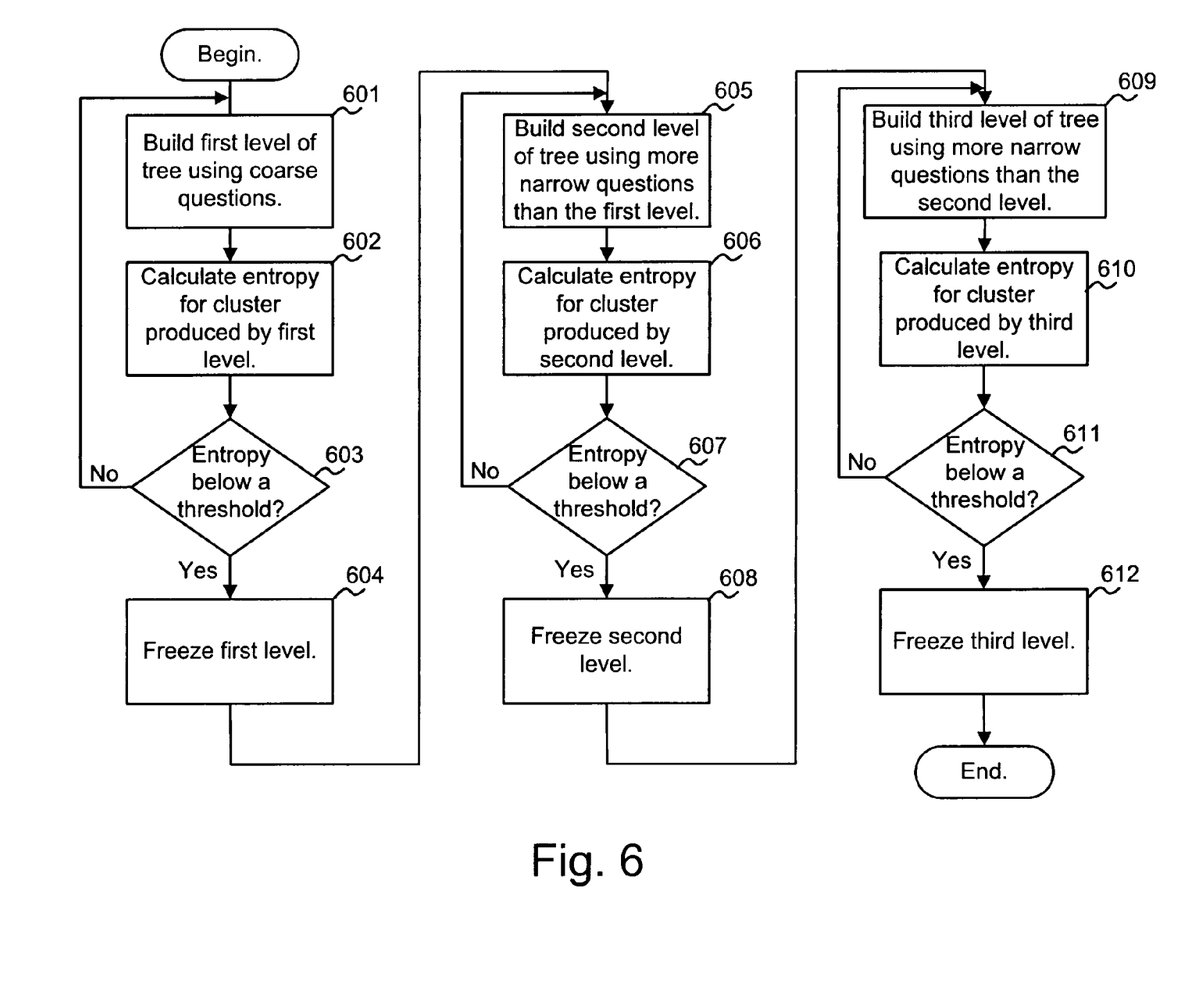
FIG. 6 is a flow chart illustrating building of the unified clustering tree shown in FIG. 5.

FIG. 6 is a flow chart illustrating building of a unified clustering tree, such as unified clustering tree 500, consistent with an aspect of the invention. A designer, such as a speech expert, builds level 501 of the clustering tree using "coarse" phoneme classification questions (Act 601). The questions in level 501 may be based on the center phoneme and its two surrounding context phonemes. Questions may additionally be based on externally measurable features, such as whether music is present. The particular questions to ask and the number of nodes to use generally depend on the speech recognition problem being addressed and can be influenced by factors, such as language that is to be recognized. Building a single level clustering tree is generally known in the art.

One method of determining the effectiveness of a level is based on the entropy of the level. Accordingly, the designer may use the entropy of a level as feedback relating to the effectiveness of the level. In particular, the designer may calculate the entropy for the first level and accept the first level when the entropy is below a preset threshold (Acts 602 and 603).

At this point, the first level may be frozen and not further modified (Act 604).

The designer then builds the second level starting from the end nodes of the first level (Act 605). The entropy for the second level is used as feedback to determine when the second level is complete (Acts 606 and 607). When it is complete, the second level may be frozen (Act 608).

At this point, the designer may then build the third level starting from the end nodes of the second level (Act 609). The entropy for the third level is used as feedback to determine when the third level is complete (Acts 610 and 611). When it is complete, the third level may be frozen (Act 612).

The process shown in FIG. 6 may be repeated for any additional levels that are desired. Although unified clustering tree 500 was shown having three levels, the unified clustering tree could be designed using the above-described concepts with two levels or more than two levels.

The type of questions corresponding to nodes 510 in each unified clustering tree will now be described in further detail.

CONCLUSION

As described above, a unified clustering tree includes a number of levels that generate phoneme clusters. A different type of speech recognition model can be derived from each level. Models at higher levels in the unified clustering tree are coarse models relative to more fine-grain models at lower levels of the clustering tree.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, while a series of acts has been presented with respect to FIG. 6, the order of the acts may be different in other implementations consistent with the present invention. Additionally, non-dependent acts may be implemented in parallel.

Certain portions of the invention have been described as software that performs one or more functions. The software may more generally be implemented as any type of logic. This logic may include hardware, such as an application specific integrated circuit a field programmable gate array, software, or a combination of hardware and software.

No element, act, or instruction used in the description of the present application should be construed as critical or essential to the invention unless explicitly described as such. Also, as used herein, the article "a" intended to include one or more items. Where only one item is intended, the term "one" or similar language is used.

The scope of the invention is defined by the claims and their equivalents.

What is claimed is:

1. A speech recognition system comprising:
    a clustering tree configured to classify a series of sounds into predefined clusters based on one of the sounds and on a predetermined number of neighboring sounds that surround the one of the sounds, where the clustering tree comprises:
        a first level with a first hierarchical arrangement of decision nodes in which the decision nodes of the first hierarchical arrangement are associated with a first group of questions relating to the series of sounds,
        a second level with a second hierarchical arrangement of decision nodes in which the decision nodes of the second hierarchical arrangement are associated with a second group of questions relating to the series of sounds, the second group of questions discriminating at a finer level of granularity within the series of sounds than the first group of questions, and
        a third level with a third hierarchical arrangement of decision nodes in which the decision nodes of the third hierarchical arrangement are associated with a third group of questions discriminating at a finer level of granularity within the series of sounds than the second group of questions; and
    a plurality of speech recognition models trained to recognize speech based on the predefined clusters, the plurality of speech recognition models comprising:
        a first model associated with the first level and including a triphone non-crossword speech recognition model,
        a second model associated with the second level and including a quinphone non-crossword speech recognition model, and
        a third model associated with the third level and including a quinphone crossword speech recognition model.

2. The system of claim 1, wherein the clustering tree is formed by freezing building of the first level of the clustering tree before building the second level of the clustering tree.

3. The system of claim 2, wherein the clustering tree is further formed by freezing building of the first level of the clustering tree when an entropy level of the first level of the clustering tree is below a predetermined threshold.

4. The system of claim 1 wherein the clustering tree is further formed by freezing building of the second level of the clustering tree before building the third level of the clustering tree.

5. The system of claim 4, wherein the clustering tree is further formed by freezing building of the second level of the clustering tree when an entropy level of the second level of the clustering tree is below a predetermined threshold.

6. The system of claim 1, wherein the clustering tree is further built to include terminal nodes that assign each of the groups of sound into one of the sound clusters.

7. The system of claim 1, wherein the first group of questions includes questions that relate to the series of sounds as a sound being modeled and one context sound before and after the sound being modeled.

8. The system of claim 7, wherein the second group of questions includes questions that relate to the series of sounds as the sound being modeled and two context sounds before and after the sound being modeled.

9. The system of claim 1 wherein higher ones of the hierarchical levels include nodes that correspond to more general questions than questions corresponding to nodes at lower ones of the hierarchical levels.

10. The system of claim 1, wherein the sounds are represented by phonemes.

11. The system of claim 1, wherein the clustering tree comprises:
    decision nodes associated with questions that relate to the series of sounds, and
    terminal nodes that define a sound cluster to which the series of sounds belong.

12. The system of claim 11, wherein the decision nodes and the terminal nodes are defined hierarchically relative to one another.

13. The system of claim 12, wherein the decision nodes correspond to lower ones of the levels in the hierarchically defined nodes are associated with more detailed questions than decision nodes corresponding to higher ones of the levels in the hierarchically defined nodes.

14. A device comprising:
    means for classifying a series of sounds into predefined clusters using a clustering tree and based on one of the sounds and a predetermined number of neighboring sounds that surround the one of the sounds, where the clustering tree includes:
        a first level with a first hierarchical arrangement of decision nodes in which the decision nodes of the first hierarchical arrangement are associated with a first group of questions relating to the series of sounds;
        a second level with a second hierarchical arrangement of decision nodes in which the decision nodes of the second hierarchical arrangement are associated with a second group of questions relating to the series of sounds, the second group of questions discriminating at a finer level of granularity within the series of sounds than the first group of questions; and
        a third level with a third hierarchical arrangement of decision nodes in which the decision nodes of the third hierarchical arrangement are associated with a third group of questions discriminating at a finer level of granularity within the series of sounds than the second group of questions; and
    means for training a plurality of speech recognition models to recognize speech based on the predefined clusters, the speech recognition models including:
        a first model associated with the first level and including a triphone non-crossword speech recognition model,
        a second model associated with the second level and including a quinphone non-crossword speech recognition model, and
        a third model associated with the third level and including a quinphone crossword speech recognition model.

* * * * *